(12) United States Patent
Sontag

(10) Patent No.: US 11,605,518 B2
(45) Date of Patent: Mar. 14, 2023

(54) CIRCUIT BREAKER TO SWITCH BETWEEN TWO ENERGY SOURCES

(71) Applicant: Frank J Sontag, Pahoa, HI (US)

(72) Inventor: Frank J Sontag, Pahoa, HI (US)

( * ) Notice: Subject to any disclaimer, the term of this patent is extended or adjusted under 35 U.S.C. 154(b) by 0 days.

(21) Appl. No.: 17/737,481

(22) Filed: May 5, 2022

(65) Prior Publication Data

US 2022/0285117 A1    Sep. 8, 2022

Related U.S. Application Data

(60) Provisional application No. 63/157,454, filed on Mar. 5, 2021.

(51) Int. Cl.
*H02J 9/06* (2006.01)
*H01H 71/08* (2006.01)
*H01H 71/52* (2006.01)

(52) U.S. Cl.
CPC ............ *H01H 71/08* (2013.01); *H01H 71/52* (2013.01); *H02J 9/062* (2013.01); *H02J 9/068* (2020.01); *H02J 9/061* (2013.01)

(58) Field of Classification Search
CPC ........ H01H 71/08; H01H 71/20; H01H 71/46; H01H 71/04; H01H 71/128; H01H 71/123; H01H 71/12; H01H 71/0207; H01H 71/0228; H01H 71/43; H01H 71/52; H01H 9/104; H01H 9/542; H01H 9/167; H01H 9/26; H01H 9/548; H01H 9/54; H01H 9/10; H01H 9/541
See application file for complete search history.

(56) References Cited

U.S. PATENT DOCUMENTS 9,343,925 B1 *   5/2016   Flegel ..................... H02J 9/00

* cited by examiner

*Primary Examiner* — Bryan R Perez
(74) *Attorney, Agent, or Firm* — Barry Choobin; Patent 360

(57) ABSTRACT

A device and method for switching between a first power source and a second power source. The device includes a first terminal, a second terminal, and a third terminal that connect to the first power source, a load, and the second power source respectively. A first switch and a breaker circuitry connect the first terminal to the second terminal. A second switch interrupts an electrical connection between the third terminal and the second terminal. A lever operably coupled to the first switch and the second switch, the lever can be actuated by the first switch to flip the second switch between the open state and the closed state.

10 Claims, 2 Drawing Sheets

CIRCUIT BREAKER TO SWITCH BETWEEN TWO ENERGY SOURCES

CROSS-REFERENCE TO RELATED APPLICATIONS

This application claims priority from the U.S. provisional patent application Ser. No. 63/157,454, filed on Mar. 5, 2021, which is incorporated herein by reference in its entirety.

FIELD OF INVENTION

The present invention relates to a circuit breaker to switch between alternate sources of energy, and more particularly, the present invention relates to a circuit breaker to switch between the main power supply and an alternate source of energy or to switch from one load to another.

BACKGROUND

Besides the main power supply through the grid, many of the buildings today also have alternate sources of energy installed. These alternate sources of energy can be renewable energy sources or a power backup in the form of a battery or power generator. Renewable sources of energy, such as solar panels have become quite common in both residential and commercial buildings. To promote the use of renewable sources of energy, governments in many countries also provide an option to buy excess renewable energy from pro-consumers.

A building having two separate sources of energy uses a complex and costly system to manage the switch between the two energy sources. Such systems are fully automatic that can also provide for sending excess stored energy to the grid.

Many times, the consumers only have a small setup of secondary/alternative energy source, such as a generator or a small solar panel. The consumer may not have enough roof space for installing solar panels. Since the amount of energy from the secondary/alternative energy source is limited, only selective loads in a building can be powered. The automated systems because of the high cost are not suitable for such consumers and the consumers must manually switch between the energy sources and loads, such as using extension cords, and the like. Fully automatic control systems are also too complex for such customers having limited second source of energy.

A need is therefore appreciated for a device to switch between the two sources of energy that is easy to use and cost-effective. A need is there for a device for consumers that have a limited amount of energy available from alternate energy sources and/or limited battery storage and would like a way to select different loads when their requirements change.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later The principal object of the present invention is therefore directed to a device that allows switching between two sources of energy and between different loads.

It is another object of the present invention that the device is cost-effective.

It is still another object of the present invention that the device is safer and easy to use.

It is yet another object of the present invention that the device provides protection against any faults.

In one aspect, disclosed is a device and method for switching between a first power source and a second power source, the device comprising a first switch configured to be flipped between an ON state, an Off state, and a neutral state; a first terminal configured to electrically connect to the first power source; a second terminal configured to electrically connect to a load; a third terminal configured to electrically connect to the second power source; a breaker circuitry configured to electrically connect the first terminal to the second terminal, wherein the breaker circuitry is configured to flip the first switch from the ON state to the neutral state upon detecting a fault in a power supply of the load, wherein the first terminal is electrically connected to the second terminal only when the first switch is in the ON state; a second switch configured to flip between an open state and a closed state, the second switch interrupts an electrical connection between the third terminal and the second terminal, wherein current flows between the third terminal and the second terminal when the second switch is the closed state, wherein current does not flows between the third terminal and the second terminal when the second switch is the open state; and a lever operably coupled to the first switch and the second switch, the lever configured to be actuated by the first switch, wherein the lever upon actuation is configured to flip the second switch between the open state and the closed state.

In one implementation, the device further includes a third switch, the third switch interrupts an electrical connection between third terminal and the second switch, the third switch configured to be flipped between a closed state and an open state, current flows between the third terminal and the second switch when the third switch is the closed state and current does not flows between the third terminal and the second switch when the third switch is the open state. The first switch is a soft switch configured to be operated by a remote control. The third switch is a soft switch configured to be operated by the remote control. The remote control is a smartphone. The first power source is a main power supply from a grid and the second power source is a renewable source of energy.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
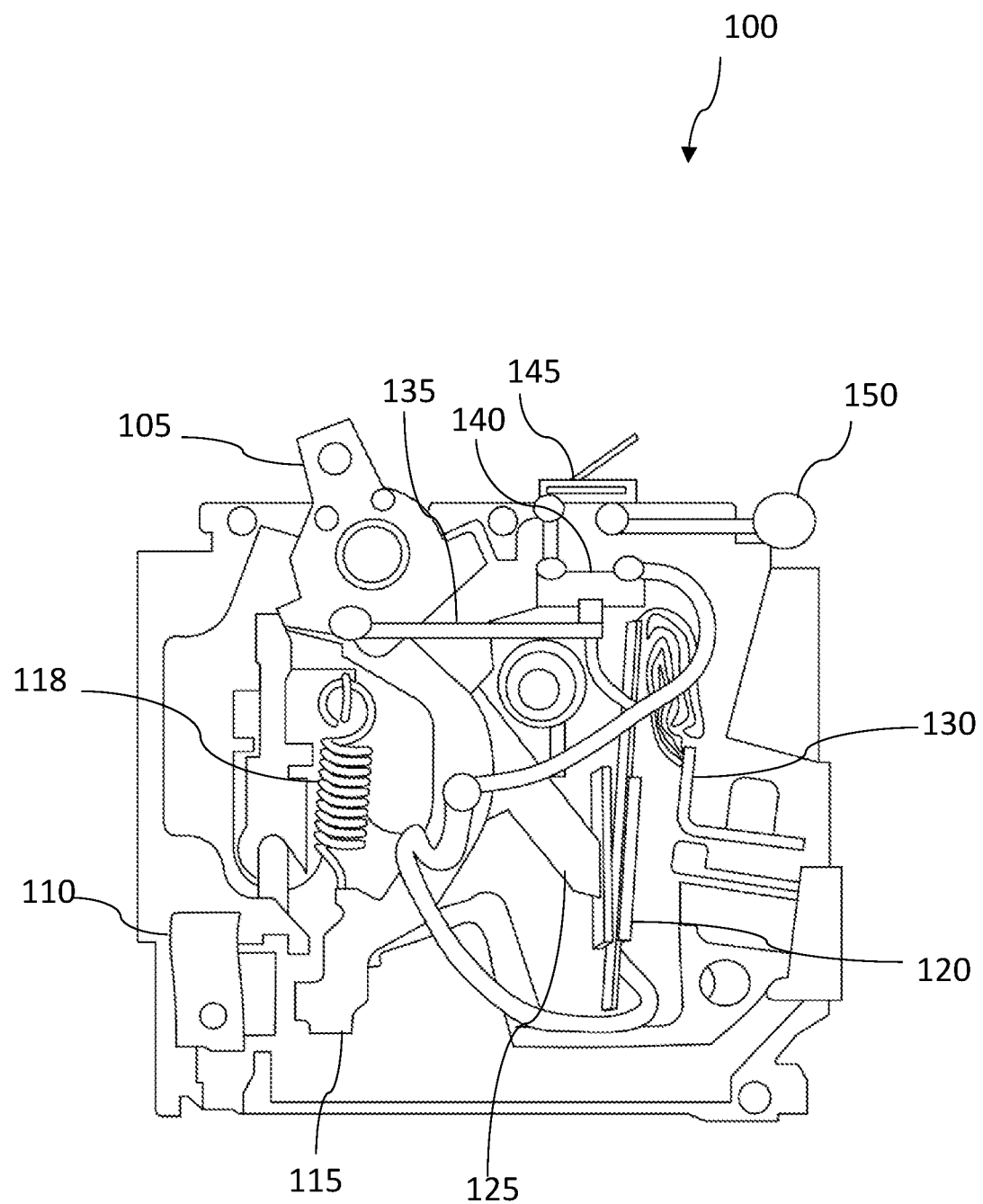
FIG. 1 shows a front view of the device, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a device that allows consumers of electricity to switch between two sources of electrical energy, such as between the main power supply from the grid and a generator, or to switch between the grid and the renewable source of energy. The device is for the consumers that have a limited capacity secondary energy source, for example, when the main power supply goes off, the consumers may need the load to the refrigerator and microwave to be switched off and then transfer their alternative energy to a new load that is now required by the household. The secondary energy source can be a generator that has limited energy output and may be used to power only essential/selective energy loads at home or a commercial building. The disclosed device is safe, cost-effective, and offers a more flexible way to select different loads right in their existing control panel especially if a portable generator is used for alternate energy. Disclosed is a circuit breaker device that allows the consumers to alternatively select from the grid's main power supply and the alternate energy source. The disclosed circuit breaker device can provide the same current/amperage protection for the load as the original circuit breaker in their existing electric control panel. The device offers consumers a safe and more cost-effective way to change power sources to different loads when using alternate energy sources right in their existing electric control panel.

Figure 2:
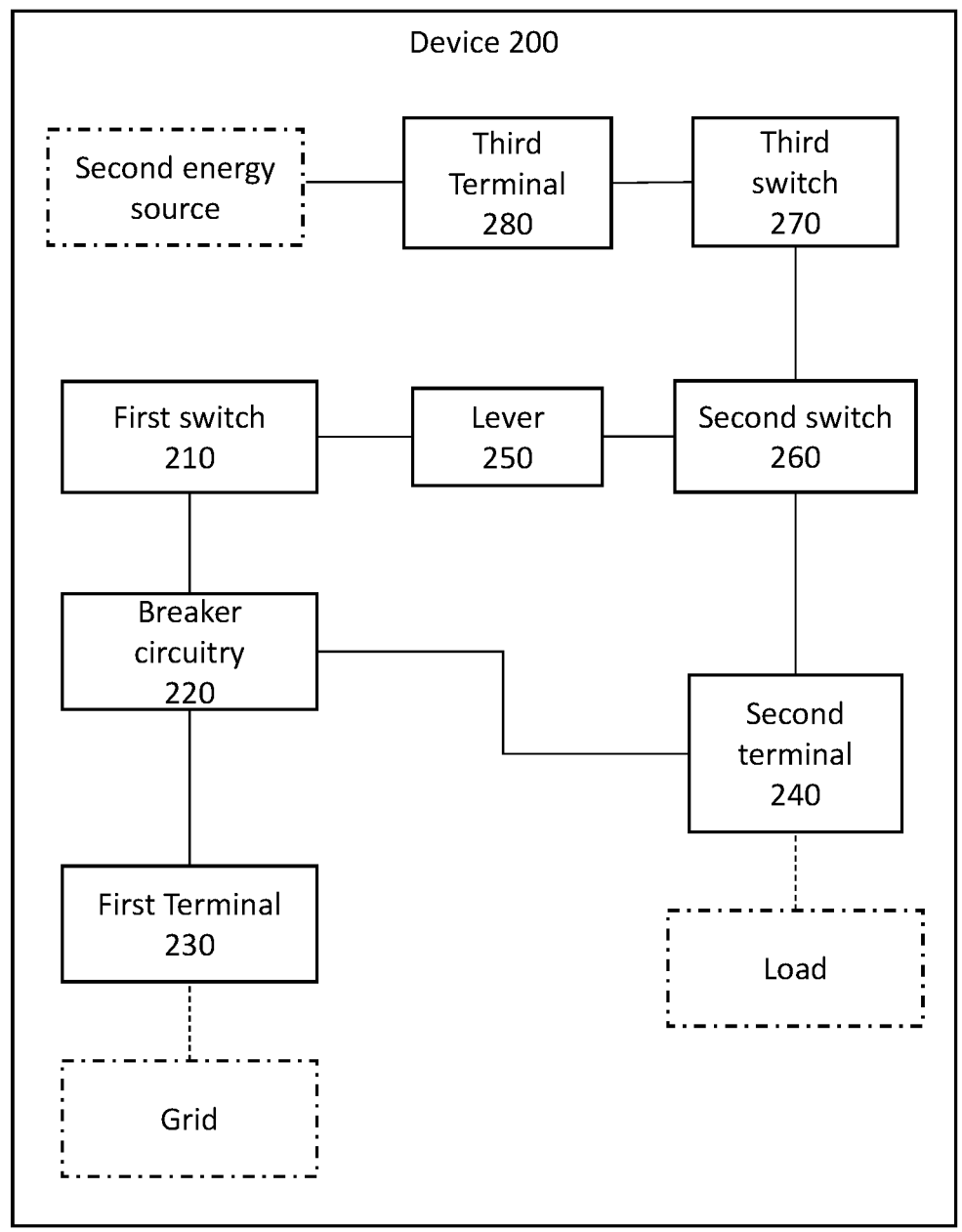
FIG. 2 is a block diagram of the disclosed device, according to an exemplary embodiment of the present invention.

Referring to FIGS. 1 and 2 illustrate an exemplary embodiment of the disclosed circuit breaker device 100. The circuit breaker device 200 shows a first switch 210 that can be the main switch for the main power supply i.e., power supply through a grid. The circuit breaker device 200 can further include a breaker circuitry 220 that can protectively connect the first terminal 230 to the second terminal 240. The breaker circuitry 220 is known in the art for use in circuit breakers, wherein the breaker circuitry 220 can interrupt the connection between the first terminal 230 and the second terminal 240 in case of abrupt current flow. Diverse types of breaker circuitry are known in the art, such as the magnetic type that uses electromagnetism to interrupt.

The first switch can be flipped between an ON state, a neutral, and an Off state. The neutral state is also referred to herein as blown state, and both terms are interchangeably used hereinafter. The Off state is also referred to herein as a reset state, and both terms are interchangeably used hereinafter. The breaker circuitry 220 can flip the first switch 210 from an ON state to a neutral state when a fault in current flow can be detected i.e., when the circuit is blown. The first switch can be manually flipped between the three states using a hard switch as shown in FIG. 1. A soft switch is also within the scope of the present invention. The soft switch can be operated by an external device, such as a remote control or a smartphone, wherein the soft switch can be flipped between the three states through the external device. The external device can connect through a wired or wireless connection. For example, remote control can connect through a network cable. Examples of wireless connection can include Wi-Fi, Bluetooth, GPRS, LTE, cellular connection, and the like. PSTN network can also be used wherein the DTMF tones can be used to flip the soft switch. Also, one or more automated commands can be used to automatically switch between the three states. The main power supply i.e., wire from the grid can connect at the first terminal 230. The load can connect at the second terminal 240.

The disclosed circuit breaker device 200 can further include a lever 250 that can operably connect the first switch 210 to the second switch 260. The flipping of the first switch 210 from the neutral state or the ON state to the Off state can actuate the lever 250 to flip the second switch from an open state to a closed state. Similarly, the flipping of the first switch 210 from the Off state to the ON state or the neutral state can drive the lever 250 to flip the second switch from the closed state to the open state. The second switch 260 can electrically connect a third terminal 280 to the second terminal 240. The second switch 260 in the closed state closes a circuit between the third terminal 280 and the second terminal 240, so that current can flow between the third terminal 280 and the second terminal 240. Similarly, the second switch 260 in the open state opens the circuit between the third terminal 280 and the second terminal 240, so to interrupt the flow of current between the third terminal 280 and the second terminal 240. As described above, the second switch 260 can be in the closed state only when the first switch 210 is in the off state. Flipping the first switch 210 to the ON state causes the second switch to flip to the open state.

A second source of energy can be connected to the third terminal 280. For example, an NM wire can connect a renewable source of energy to the third terminal 280. Current can flow between the third terminal 280 and the load when the second switch 260 is in the closed state. Thus, when the power supply from the main grid is being supplied to the load, the alternate source of energy remains cut-off. The alternate source of energy can only be connected to the load when the main switch is turned off. Thus, the load cannot be connected to both the grid and the alternate source of energy at the same time.

A third switch 270 can also be provided that interrupts the circuit between the third terminal 280 and the second switch 260. A third switch 270 can provide additional safety while switching between the two energy sources i.e., the main power supply and the alternate source of energy. While the second switch 260 is closed by flipping the first switch 210 to the off state, the current cannot flow from the third terminal 280 to the second terminal 240 unless the third switch 270 is also flipped to a closed state. The third switch can be provided as a hard switch or a soft switch, similar to the first switch 210. The flipping of the first switch 210 and the third switch 270 based on the available sources of energy can be automated. Both the first switch 210 and the third switch 270 can be remotely controlled through the external device. It is to be noted that the current flows through the third switch 270 in the closed state and does not flow in the open state.

In certain implementations, the breaker circuitry 220 can flip the first switch 210 from either of the ON state and the Off state to the neutral state. Thus, the breaker circuitry 220 can provide protection against both the power supplies i.e., power supplies at first terminal 230 and the third terminal 280. In case any fault can be detected in the current supply to the load, such as a short circuit, the breaker circuitry 220 can flip the first switch 210 to the neutral state from the On state or the Off state. Alternatively, a separate breaker circuitry can be provided for the third switch 270 and the third switch 270 can be similar to the first switch 210.

The amperage or rating of the disclosed circuit breaker device 100 can depend upon the load and could be the same as the rating given for a standard circuit breaker. This circuit breaker device 100 can be manufactured for any ampere rating or any voltage rating like any standard circuit breakers: for example, a 220 Volt circuit breaker with two source selections could be easily adapted by using the same principles and materials according to the present invention. FIG. 1 shows a first switch 105, a first terminal 110, a moving contact 115, a latch spring 118, an electromagnet 120, an actuating arm 125, a second terminal 130, a lever 135, a second switch 140, a third switch 145, and a third terminal 150. The working of different components has been described above in reference to FIG. 2 and has not been repeated here.

When the circuit is blown, the moving contact 115 get separate from the first terminal 110, which in turn separates the load from the grid. It is understood that all the components of the breaker circuitry have not be described because the working of circuit breakers is well known. For example, additional springs may be needed to move the contact 115.

For use, an NM cable from the existing control panel can be connected to the alternate energy source or if two or more of the disclosed devices are installed, a distribution bar may be required in the control panel. The distribution bar can be used to supply alternative energy sources to each of the disclosed devices installed. The disclosed device can provide a choice between two power sources, such as the grid and the alternative energy source. The disclosed device can allow control overloads that could be powered by an alternative source of energy. For example, a consumer using a portable generator rated at 4000 watts, may need the stove and refrigerator on right now and then later may want to run the air conditioner for an hour or two or even later maybe the furnace and the family room for an hour or two. Thus, with two or more of these devices installed, consumers will have the flexibility to turn on any loads that they choose at installation and run that load at the time of their choosing. Smaller alternate energy systems just cannot run all consumer needs at the same time, but the disclosed device offers consumers the ability to run or kill power to their selected loads when they decide or need to have power to that load. Being able to select available wattage to different loads would be extremely important for consumers who want the flexibility to turn on or off different rooms or appliances when their needs change. Thus, with the disclosed device, when the natural grid is on and the batteries may be fully charged, the consumers can use that entire extra alternate energy source to run any load they chose and save utility costs. And when the natural grid is off consumers can enjoy their dinner, shut off the kitchen, and then send the power to any room of their choosing thus maximizing the available wattage.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A device for switching between a first power source and a second power source, the device comprising:
    a first switch configured to be flipped between an ON state, an Off state, and a neutral state;
    a first terminal configured to electrically connect to the first power source;
    a second terminal configured to electrically connect to a load;
    a third terminal configured to electrically connect to the second power source;
    a breaker circuitry configured to electrically connect the first terminal to the second terminal, wherein the breaker circuitry is configured to flip the first switch from the ON state to the neutral state upon detecting a fault in a power supply of the load, wherein the first terminal is electrically connected to the second terminal only when the first switch is in the ON state;
    a second switch configured to flip between an open state and a closed state, the second switch interrupts an electrical connection between the third terminal and the second terminal, wherein current flows between the third terminal and the second terminal when the second switch is the closed state, wherein current does not flows between the third terminal and the second terminal when the second switch is the open state;
    a lever operably coupled to the first switch and the second switch, the lever configured to be actuated by the first switch, wherein the lever upon actuation is configured to flip the second switch between the open state and the closed state; and
    a third switch, the third switch interrupts an electrical connection between third terminal and the second switch, the third switch configured to be flipped between a closed state and an open state, current flows between the third terminal and the second switch when the third switch is the closed state and current does not flow between the third terminal and the second switch when the third switch is the open state.

2. The device according to claim 1, wherein the first switch is a soft switch configured to be operated by a remote control.

3. The device according to claim 2, wherein the third switch is a soft switch configured to be operated by the remote control.

4. The device according to claim 3, wherein the remote control is a smartphone.

5. The device according to claim 1, wherein the first power source is a main power supply from a grid and the second power source is a renewable source of energy.

6. A method for switching between a first power source and a second power source, the method comprising the steps of:
providing a device comprising:
a first switch configured to be flipped between an ON state, an Off state, and a neutral state,
a first terminal configured to electrically connect to the first power source,
a second terminal configured to electrically connect to a load,
a third terminal configured to electrically connect to the second power source,
a breaker circuitry configured to electrically connect the first terminal to the second terminal, wherein the breaker circuitry is configured to flip the first switch from the ON state to the neutral state upon detecting a fault in a power supply of the load, wherein the first terminal is electrically connected to the second terminal only when the first switch is in the ON state,
a second switch configured to flip between an open state and a closed state, the second switch interrupts an electrical connection between the third terminal and the second terminal, wherein current flows between the third terminal and the second terminal when the second switch is the closed state, wherein current does not flows between the third terminal and the second terminal when the second switch is the open state,
a lever operably coupled to the first switch and the second switch, the lever configured to be actuated by the first switch, wherein the lever upon actuation configured to flip the second switch between the open state and the closed state, and
a third switch, the third switch interrupts an electrical connection between third terminal and the second switch, the third switch configured to be flipped between a closed state and an open state, current flows between the third terminal and the second switch when the third switch is the closed state and current does not flow between the third terminal and the second switch when the third switch is the open state.

7. The method according to claim 6, wherein the first switch is a soft switch configured to be operated by a remote control.

8. The method according to claim 7, wherein the third switch is a soft switch configured to be operated by the remote control.

9. The method according to claim 8, wherein the remote control is a smartphone.

10. The method according to claim 6, wherein the first power source is a main power supply from a grid and the second power source is a renewable source of energy.

* * * * *